United States Patent
Sunagawa et al.

(10) Patent No.: US 6,677,081 B2
(45) Date of Patent: Jan. 13, 2004

(54) POSITIVE ELECTRODE ACTIVE MATERIAL FOR NON-AQUEOUS ELECTROLYTE SECONDARY BATTERY

(75) Inventors: Takuya Sunagawa, Sumoto (JP); Ryuji Ohshita, Neyagawa (JP); Shin Fujitani, Hirakata (JP)

(73) Assignee: Sanyo Electric Co., Ltd., Osaka (JP)

(*) Notice: Subject to any disclaimer, the term of this patent is extended or adjusted under 35 U.S.C. 154(b) by 29 days.

(21) Appl. No.: 09/863,820

(22) Filed: May 24, 2001

(65) Prior Publication Data

US 2003/0003361 A1 Jan. 2, 2003

(30) Foreign Application Priority Data

May 24, 2000 (JP) .................................. 2000-153734

(51) Int. Cl.[7] .......................... H01M 4/50; C01G 45/02
(52) U.S. Cl. ........................ 429/224; 423/599
(58) Field of Search ........................ 429/223, 224, 429/231.1, 231.95; 423/594.3, 599

(56) References Cited

U.S. PATENT DOCUMENTS

| 5,604,057 A | 2/1997 | Nazri | 429/224 |
| 5,993,998 A | * 11/1999 | Yasuda | 429/231.95 |

FOREIGN PATENT DOCUMENTS

| EP | 615296 A1 | * 9/1994 |
| JP | 09-171817 A | * 6/1997 |
| JP | 11-283627 | 10/1999 |
| JP | 11-297323 | 10/1999 |
| JP | 2000-327340 A | * 11/2000 |
| WO | WO 01/93348 A2 | * 12/2001 |

OTHER PUBLICATIONS

Liu et al., "Lithium intercalation and alloying effects on electronic structures of spinel lithium manganese oxides", Solar Energy Materials and Solar Cells, vol. 62, Issues 1–2, Apr. 15, 2000, pp. 81–87.*

The JPO machine translation for JP 2000–327340 A (Nov. 28, 2000).*

Jun John Xu, et al.; "Amorphous Manganese Dioxide: A High Capacity Lithium Intercalation Host"; Electrochemical and Solid–State Letters, 1 (1) 1–3 (1998), [no month available].

* cited by examiner

*Primary Examiner*—Susy Tsang-Foster
(74) *Attorney, Agent, or Firm*—Kubovcik & Kubovcik

(57) ABSTRACT

The present invention provides a positive electrode active material for a non-aqueous electrolyte secondary battery and a non-aqueous electrolyte secondary battery having the positive electrode active material. The positive electrode active material includes a complex oxide wherein said complex oxide is substantially amorphous and comprises Mn and M; where M is selected from the group consisting of Ni, Co, Fe, Cu, Al, Mg, Si, Sc, Ti, Zn, Ga, Ge, Nb, Rh, Pd and Sn; and the molar weighted sum of oxidation states of elements except for oxygen is more than 3.8 and not greater than 4.2. More preferably, a mole ratio of Mn and M (Mn:M) is in a range of 99:1~70:30.

4 Claims, 3 Drawing Sheets

POSITIVE ELECTRODE ACTIVE MATERIAL FOR NON-AQUEOUS ELECTROLYTE SECONDARY BATTERY

FIELD OF THE INVENTION

The present invention relates to a positive electrode active material for a non-aqueous electrolyte secondary battery.

BACKGROUND OF THE INVENTION

A non-aqueous electrolyte secondary battery that is currently commercially available uses $LiCoO_2$ as a positive electrode active material and a carbon material as a negative electrode active material. Charge-discharge capacity of a non-aqueous electrolyte secondary battery usually depends on the active materials used for the positive and negative electrodes. Therefore, an active material that can provide greater capacity to a battery has been sought.

Recently, an amorphous material has been proposed as a material to provide greater capacity than $LiCoO_2$ (Japanese Patent Laid-open Publication No. 11-283627). Among various materials, a manganese oxide is the most promising especially for use as a positive electrode active material because of raw material cost and the amount of resources (Japanese Patent Laid-open Publication Nos. 9-171817 and 11-297323, and J. J. Xu et al., Electrochemical and Solid-State Letters, 1, 1-3 (1998) et al.).

However, the amorphous manganese oxide proposed in Japanese Patent Laid-open Publication No. 11-297323 includes K (potassium). When the manganese oxide is used as a positive electrode material for a lithium secondary battery, K ions move between a positive electrode and a negative electrode together with Li ions, and adversely affect discharge potential and the like.

The amorphous manganese oxide proposed in Electrochemical and Solid-State Letters, 1, 1-3 (1998) and Japanese Patent Laid-open Publication No. 9-171817 has a great discharge capacity when it is used as an active material for a lithium secondary battery, but improvement of load characteristics is required. That is, a battery having the amorphous manganese oxide does not have a great discharge capacity with regular current because the load characteristics of the amorphous manganese oxide are not as good as $LiCOO_2$.

OBJECT OF THE INVENTION

Objects of the present invention are to provide a positive electrode active material for a non-aqueous electrolyte secondary battery and to provide a non-aqueous electrolyte secondary battery having the positive electrode active material.

SUMMARY OF THE INVENTION

The present invention provides a positive electrode active material for a non-aqueous electrolyte secondary battery comprising a complex oxide wherein said complex oxide is substantially amorphous and comprises Mn and M, where M is an element selected from the group consisting of Ni, Co, Fe, Cu, Al, Mg, Si, Sc, Ti, Zn, Ga, Ge, Nb, Rh, Pd and Sn; and a molar weighted sum of oxidation states of elements except for oxygen is more than 3.8 and not greater than 4.2 (3.8≦molar weighted sum of oxidation states≦4.2).

Figure 1:
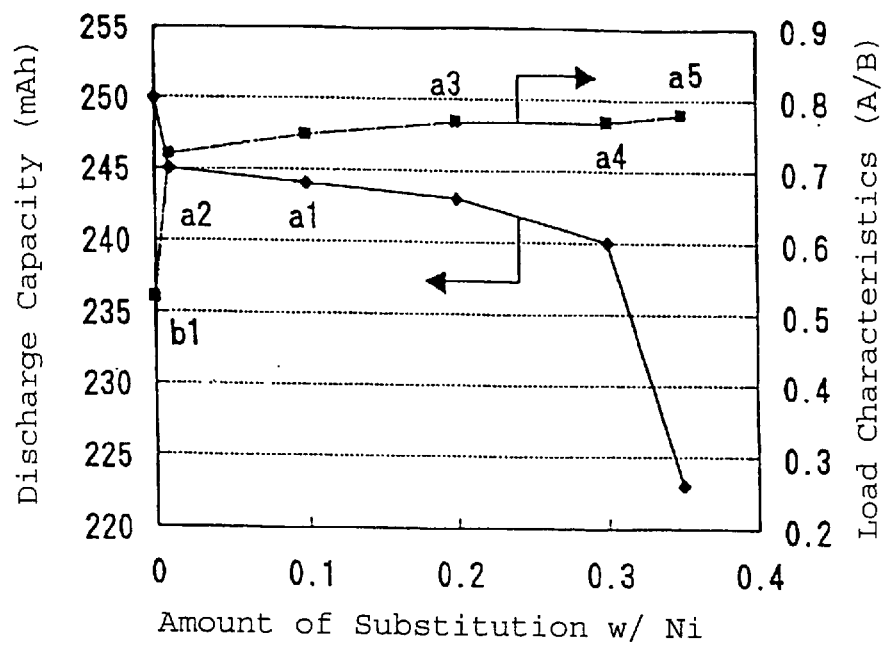
FIG. 1 shows a relationship between an amount of substitution with Ni, discharge capacity and load characteristics according to the present invention.

1: a positive electrode
2: a positive electrode current collector
3: a positive electrode can
4: an insulation packing
5: a negative electrode can
6: a negative electrode current collector
7: a negative electrode
8: a separator

DETAILED EXPLANATION OF THE INVENTION

A portion of Mn in a Mn oxide is replaced with an element M to increase load characteristics in a positive electrode active material in the present invention. It is believed that substitution with M changes the electronic structure in the Mn oxide.

The complex oxide comprising Mn and M is prepared by an aqueous redox sol-gel method in an aqueous solution such as that for preparing amorphous manganese oxide as described in Electrochemical and Solid-State Letters, 1, 1-3 (1998) and Japanese Patent Laid-open Publication No. 9-171817, and incorporated herein by reference.

A mole ratio of Mn and the substitutive element M (Mn:M) is preferably in a range of 99:1~70:30. When the amount of M is less than the above range, the effect, i.e., increase of load characteristics, obtained by the substitution with M, is not satisfactory, and when M is more than the above range, the discharge capacity of the battery is reduced.

Among the elements described above, Ni and Fe are especially preferred as M. When these elements are partially substituted for Mn, the load characteristics of a battery of the present invention can be improved more than with the other elements.

A non-aqueous electrolyte secondary battery of the present invention includes a positive electrode having the positive electrode active material of the present invention, a negative electrode and a non-aqueous electrolyte.

Materials for a secondary battery, except for the positive electrode active material, that are convenient and known can be used for the non-aqueous electrolyte secondary battery of the present invention without limitation.

As a negative electrode active material, lithium metal; a lithium alloy which can occlude or release lithium ion, for example, lithium-aluminum alloy, lithium-lead alloy, lithium-tin alloy, lithium-silicon alloy, and the like; a carbon material, for example, graphite, coke, calcined organic matter, and the like; and a metal oxide having a potential lower than that of the positive electrode active material, for example, $SnO_2$, $SnO$, $TiO_2$, and $Nb_2O_3$, can be illustrated.

As a solvent of the nonaqueous electrolyte, a high boiling point solvent, for example, ethylene carbonate (EC), propylene carbonate (PC), vinylene carbonate (VC), butylene carbonate (BC), and the like, and a mixture of the high boiling point solvent and a low boiling point solvent, for example, dimethyl carbonate (DMC), diethyl carbonate (DEC), ethyl methyl carbonate (EMC), 1,2-diethoxyethane (DEE), 1,2-dimethoxyethane (DME), and the like can be used.

Lithium ion can be initially included either in a positive electrode or a negative electrode in a non-aqueous electrolyte secondary battery of the present invention. When the lithium ion is initially included in the negative electrode, a secondary battery can be discharged at an initial stage. When the lithium ion is initially included in the positive electrode, a secondary battery can be discharged after charging.

DESCRIPTION OF PREFERRED EMBODIMENT

The present invention is described below in detail in conjunction with certain examples. However, it is of course understood that the present invention is not limited to the following examples. The present invention can be modified within the scope and spirit of the appended claims.

EXAMPLE 1

[Preparation of Positive Electrode]

Figure 4:
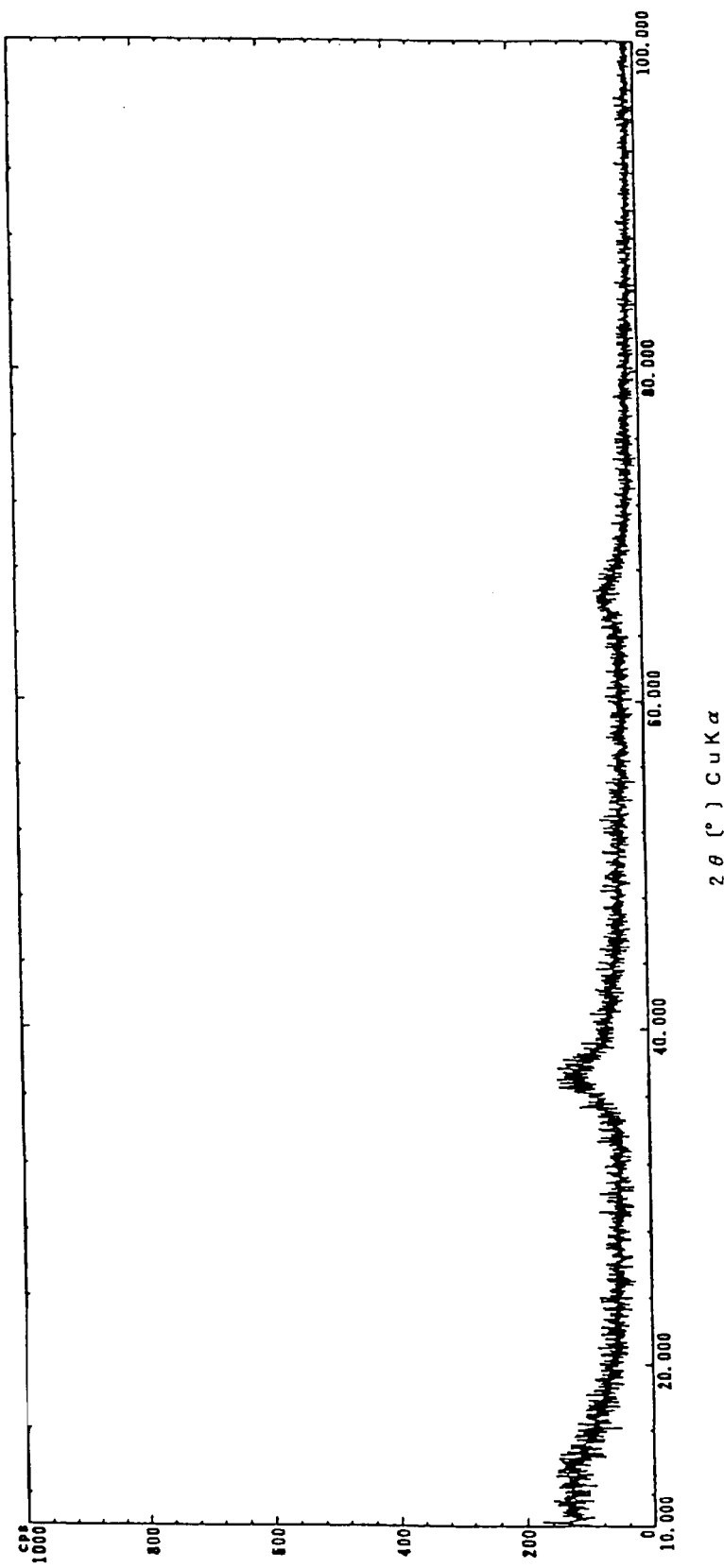
FIG. 4 is an X-ray diffraction pattern of a positive electrode active material according to an embodiment of the present invention.

An aqueous solution having predetermined amounts of $NaMnO_4$ and $Ni(NO_3)_2$ dissolved therein was stirred while adjusting pH. An aqueous solution of $Mn(NO_3)_2$ was added to the solution including $NaMnO_4$ and $Ni(NO_3)_2$ until the purple color of $NaMnO_4$ disappeared. Precipitate was treated with a sulfuric acid solution to remove $Mn^{2+}$ and $Mn^{3+}$, and was washed with water and was dried to obtain a complex oxide including Mn and Ni. The oxidation state of Mn and Ni was determined by titration. The molar weighted sum of the oxidation states was 3.92. The contents of Mn and Ni were determined by atomic-absorption spectroscopy. The results showed that the formula of the complex oxide was $Mn_{0.90}Ni_{0.10}O_{1.96}$. An X-ray diffraction pattern of the complex oxide was obtained. FIG. 4 is the X-ray diffraction pattern chart of the complex oxide. As is clear from FIG. 4, there were no sharp peaks between 10° and 100°, and the complex oxide is substantially amorphous.

Acetylene black as a conductive agent and polyvinylidene fluoride as a binder were added to the positive electrode active material at a weight ratio of 60:10:30 (active material:acetylene black:polyvinylidene fluoride) to prepare a positive electrode mixture. The positive electrode mixture was pressed to form a disc with a diameter of 20 mm at 2 ton/cm². The product was heated in a vacuum at 250° C. for 2 hours to prepare a positive electrode.

[Preparation of Negative Electrode]

A lithium aluminum alloy sheet having a predetermined thickness was cut into a disc having a diameter of 20 mm to prepare a negative electrode.

[Preparation of Non-aqueous Electrolyte]

LiPF6 was dissolved in a mixture of ethylene carbonate and dimethyl carbonate at a volume ratio of 1:1 in an amount of 1 mol/l to prepare a non-aqueous electrolyte.

[Preparation of Battery]

A coin-shaped non-aqueous electrolyte secondary battery a1 was prepared from the positive electrode, the negative electrode and the electrolyte prepared above. An ion permeable polypropylene film was used as a separator.

Figure 2:
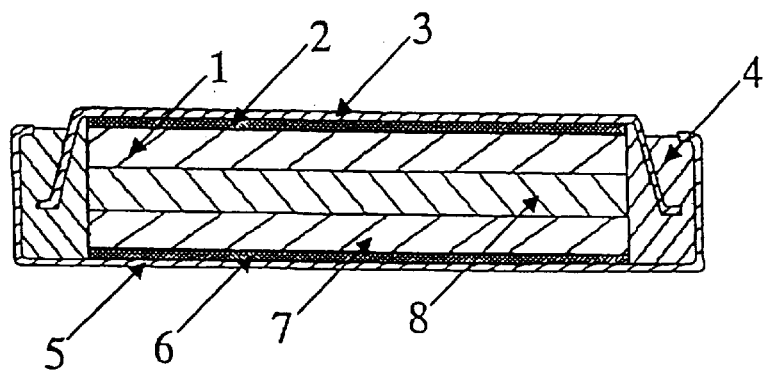
FIG. 2 is a cross-section of a coin-shaped non-aqueous electrolyte secondary battery prepared according to an embodiment of the present invention.

FIG. 2 is a cross-section of an illustration of the prepared coin-shaped non-aqueous electrolyte secondary battery. The secondary battery includes a positive electrode 1, a negative electrode 7, a separator 8 which separates the positive electrode 1 and the negative electrode 7, a positive electrode can 3, a negative electrode can 5, a positive electrode current collector 2, a negative electrode current collector 6 and a insulator packing 4 made from polypropylene as shown in FIG. 2. The positive electrode 1 and the negative electrode 7 are housed in a battery case formed by the positive electrode can 3 and the negative electrode can 5. The electrodes are located on opposite sides of the separator 8. The positive electrode 1 is connected to the positive electrode can 3 through the positive electrode current collector 2, and the negative electrode 7 is connected to the negative electrode can 5 through the negative electrode current collector 6. Chemical energy created in the battery can be taken out as electric energy.

EXAMPLES 2–5

Complex oxides having the formulas shown in Table 1 were prepared in the same manner as in Example 1 except that the amounts of $NaMnO_4$ and $Ni(NO_3)_2$ were varied. Non-aqueous electrolyte secondary batteries a2~a5 were prepared in the same manner as Example 1 except that the complex oxides prepared above were used As the positive electrode active material.

COMPARATIVE EXAMPLE 1

A complex oxide having formula $MnO_{2.00}$ was prepared in the same manner as Example 1 except that $Ni(NO_3)_2$ was not used to prepare the complex oxide. A non-aqueous electrolyte secondary battery b1 was prepared in the same manner as Example 1 except that the complex oxide prepared above was used as the positive electrode active material.

TABLE 1

|  | Battery | Active Material Composition |
|---|---|---|
| Comparative Example 1 | b 1 | $MnO_{2.00}$ |
| Example 2 | a 2 | $Mn_{0.99}Ni_{0.01}O_{2.06}$ |
| Example 1 | a 1 | $Mn_{0.90}Ni_{0.10}O_{1.96}$ |
| Example 3 | a 3 | $Mn_{0.80}Ni_{0.20}O_{1.98}$ |
| Example 4 | a 4 | $Mn_{0.70}Ni_{0.30}O_{2.02}$ |
| Example 5 | a 5 | $Mn_{0.65}Ni_{0.35}O_{2.02}$ |

[Charge-Discharge Test]

Batteries prepared above were discharged to 1.5 V at a constant current, 0.4 mA, at room temperature (25° C.). Subsequently, the batteries were charged to 3.7 V at a constant current, 0.4 mA, and then were discharged to 1.5 V at a constant current, 0.4 mA. The obtained discharge capacity was B mAh.

After charging of the batteries under the same conditions was conducted again, the batteries were discharged to 1.5 V at 2.0 mA (constant current). The obtained discharge capacity was A mAh. A ratio of discharge capacities A/B was calculated. A higher ratio is an indicator of better load characteristics.

Discharge capacity B and a ratio of discharge capacities A/B are shown in FIG. 1 together with an amount of substitution with Ni.

As is clear from FIG. 1, batteries a1~a5 having a complex oxide in which a part of Mn is substituted with Ni according to the present invention have improved load characteristics as compared to comparative battery b1. When the amount of substituted Ni exceeds 0.3, discharge capacity is decreased.

When a complex oxide is represented by a formula $Mn_{1-x}M_xO_y$ ($0.01 \leq x \leq 0.3$ and $1.9 \leq y \leq 2.1$), load characteristics can be improved while maintaining high capacity.

EXAMPLE 6

[Preparation of Positive Electrode and Battery]

An aqueous solution having predetermined amounts of $NaMnO_4$ and $Fe(NO_3)_3$ dissolved therein was stirred while adjusting pH. An aqueous solution of $Mn(NO_3)_2$ was added to the solution including $NaMnO_4$ and $Fe(NO_3)$ until the purple color of $NaMnO_4$ disappeared. Precipitate was treated with a sulfuric acid solution to remove $Mn^{2+}$ and $Mn^{3+}$, and was washed with water and was dried to obtain a complex oxide including Mn and Fe. The oxidation state of Mn and Fe was determined by titration. The molar weighted sum of the oxidation states was 3.96. The contents of Mn and Fe were determined by atomic-absorption spectroscopy. The results showed that a formula of the complex oxide is $Mn_{0.89}Fe_{0.11}O_{1.96}$.

A non-aqueous electrolyte secondary battery a6 was prepared in the same manner as Example 1 except that the complex oxide prepared above was used as the positive electrode active material.

EXAMPLES 7~10

Complex oxides having the formulas shown in Table 2 were prepared in the same manner as in Example 6 except that the amounts of $NaMnO_4$ and $Fe(NO_3)_3$ were varied. Non-aqueous electrolyte secondary batteries a7~a10 were prepared in the same manner as in Example 1 except that the complex oxides prepared above were used as the positive electrode active material. The composition of Comparative Example 1 is also shown in Table 2.

TABLE 2

|  | Battery | Active Material Composition |
| --- | --- | --- |
| Comparative Example 1 | b 1 | $MnO_{2.00}$ |
| Example 7 | a 7 | $Mn_{0.99}Fe_{0.01}O_{2.02}$ |
| Example 6 | a 6 | $Mn_{0.89}Fe_{0.11}O_{1.96}$ |
| Example 8 | a 8 | $Mn_{0.80}Fe_{0.20}O_{2.00}$ |
| Example 9 | a 9 | $Mn_{0.70}Fe_{0.30}O_{2.02}$ |
| Example 10 | a 10 | $Mn_{0.65}Fe_{0.35}O_{1.98}$ |

[Charge-Discharge Test]

The batteries prepared above were subjected to a charge-discharge test in the same manner as in Examples 1~5 to obtain discharge capacities A and B, and discharge capacity ratio A/B. The results are shown in FIG. 3.

Figure 3:
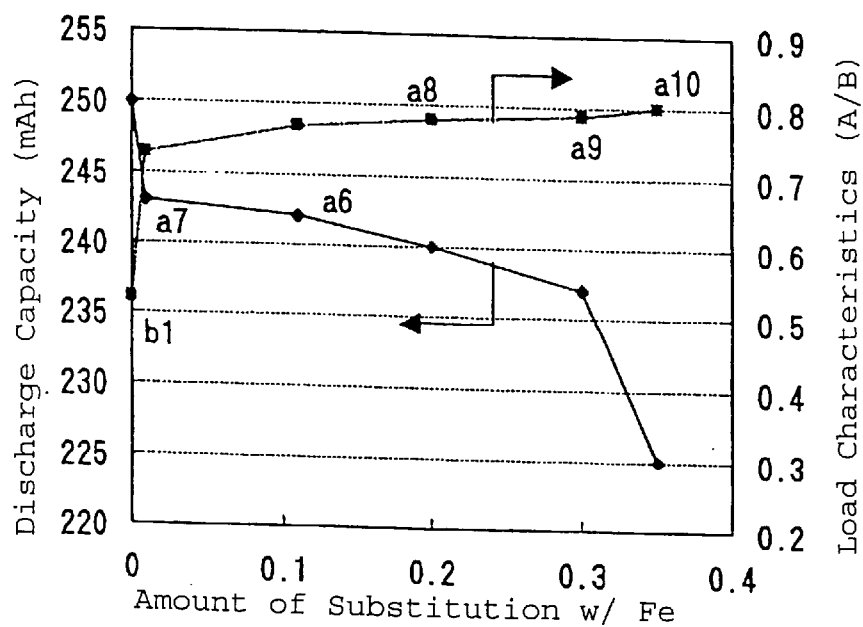
FIG. 3 shows a relationship between an amount of substitution with Fe, discharge capacity and load characteristics according to the present invention.

As is clear from FIG. 3, batteries a6~a10 having a complex oxide in which a part of Mn is substituted with Fe according to the present invention have improved load characteristics as compared to comparative battery b1. When an amount of substituted Fe exceeds 0.3, discharge capacity is decreased.

When the complex oxide is represented by the formula $Mn_{1-x}M_xO_y$ ($0.01 \leq x \leq 0.3$ and $1.9 \leq y \leq 2.1$), load characteristics can be improved while maintaining high capacity.

ADVANTAGES OF THE INVENTION

According to the present invention, a non-aqueous electrolyte secondary battery having excellent load characteristics with high capacity is obtained.

What is claimed is:

1. A positive electrode active material for a non-aqueous electrolyte secondary battery comprising a complex oxide wherein said complex oxide is substantially amorphous and is represented by the formula $Mn_{1-x}M_xO_y$;

where M is selected from the group consisting of Ni, Co, Fe, Cu, Al, Mg, Si, Sc, Ti, Zn, Ga, Ge, Nb, Rh, Pd and Sn, and x and y are $0.01 \leq x \leq 0.3$ and $1.9 \leq y \leq 2.1$, respectively; and a molar weighted sum of oxidation states of elements except for oxygen is more than 3.8 and not greater than 4.2.

2. A positive electrode active material for a non-aqueous electrolyte secondary battery according to claim 1 wherein M is selected the group consisting of Ni and Fe.

3. A non-aqueous electrolyte secondary battery comprising a positive electrode, a negative electrode and a non-aqueous electrolyte, wherein said positive electrode comprises a positive electrode active material according to claim 1.

4. A non-aqueous electrolyte secondary battery comprising a positive electrode, a negative electrode and a non-aqueous electrolyte, wherein said positive electrode comprises a positive electrode active material according to claim 2.

* * * * *